United States Patent [19]

Matsushita et al.

[11] Patent Number: 5,204,384

[45] Date of Patent: Apr. 20, 1993

[54] ONE-PART CURABLE ORGANOSILOXANE COMPOSITION

[75] Inventors: Takao Matsushita; Toshio Saruyama, both of Chiba, Japan

[73] Assignee: Dow Corning Toray Silicone Co., Ltd., Tokyo, Japan

[21] Appl. No.: 644,788

[22] Filed: Jan. 23, 1991

[51] Int. Cl.⁵ ............................................. C08K 9/10
[52] U.S. Cl. ................................ 523/211; 524/403; 524/413; 524/431; 524/432; 524/176; 524/175; 524/588; 524/862; 524/780; 524/785; 524/783; 524/771; 524/789; 524/772; 524/357; 524/398; 524/399
[58] Field of Search ................ 523/211; 524/403, 413, 524/431, 432, 176, 175, 588, 398, 862, 399, 780, 785, 783, 771, 789, 772

[56] References Cited

U.S. PATENT DOCUMENTS

| | | | |
|---|---|---|---|
| 4,481,341 | 11/1984 | Schlak et al. | 525/478 |
| 4,528,313 | 7/1985 | Swihart et al. | 524/397 |
| 4,742,103 | 5/1988 | Morita et al. | 524/176 |
| 4,766,176 | 8/1988 | Lee et al. | 528/31 |
| 4,824,903 | 4/1989 | Aizawa et al. | 524/772 |
| 5,015,691 | 5/1991 | Lewis et al. | 528/15 |
| 5,015,716 | 5/1991 | Togashi et al. | 528/15 |

*Primary Examiner*—John C. Bleutge
*Assistant Examiner*—Karen A. Dean
*Attorney, Agent, or Firm*—Robert Spector

[57] ABSTRACT

The curable organosiloxane compositions of the present invention contain a hydrosilylation catalyst that is microencapsulated within a layer of silicone resin or polysilane resin. These compositions are characterized by the presence of carbon black or a member from a specified group of metal compounds that prevents coagulation in cured materials of the resin portion of the microencapsulated catalyst.

5 Claims, No Drawings

ONE-PART CURABLE ORGANOSILOXANE COMPOSITION

BACKGROUND OF THE INVENTION

1. Field of the Invention

This invention relates to curable organosiloxane compositions. More particularly, this invention relates to organosiloxane compositions that cure by a platinum-catalyzed hydrosilylation reaction and contain the catalyst encapsulated within particles of a polysilane resin or silicone resin to provide excellent storage stability at room temperature and rapid curing above the softening temperature of the resin. The compositions yield highly heat-resistant elastomer moldings.

Background Information

Organosiloxane compositions that cure by a hydrosilylation reaction are distinguished by a rapid cure in deep sections without the development of reaction by-products. These compositions find application in a wide range of fields as, for example, molding rubbers, adhesives, potting agents for electrical and electronic products, coatings, and release coatings for papers and films.

Curable organosiloxane compositions containing a platinum-containing catalyst that is embedded or microencapsulated within a layer of silicone resin are known. Specifically, U.S. Pat. No. 4,481,341, which issued to Schlak et al. on Nov. 6, 1984 describes curable organosiloxane compositions containing a finely divided blend of a platinum-containing catalyst and a silicone resin.

The use of silicone resins and polysilane resins to microencapsulate platinum-containing catalysts for curable organosiloxane composition is disclosed in commonly assigned copending U.S. patent applications Ser. No. 370,418, U.S. Pat. No. 5,015,716, and application Ser. No. 370,419, filed on Jun. 22, 1989, now abandoned.

The present inventors discovered that compositions containing hdyrosilylation reaction catalysts that are microencapsulated within a layer of silicone or polsilane resin exhibit excellent storage stability in the neighborhood of room temperature. However, when the cured elastomer molding is subjected to long-term heating the silicone resin or polysilane resin coagulates within the body of the molding. In addition to being undesirable from the standpoint of appearance, the coagulated resin adversely affects the mechanical strength of the elastomer molding.

The present inventors carried out extensive research directed at a solution to the aforementioned problem, and they discovered as a result that when a member of a specified group of metal compounds is blended into an curable organosiloxane composition containing a platinum-containing or other type of hydrosilylation catalyst microencapsulated in a silicone or polysilane resin, the resin does not coagulate even when the cured elastomer molding is subjected to long-term heating.

An objective of the present invention is to provide a curable organosiloxane composition exhibiting 1) excellent storage stability in the vicinity of room temperature by virtue of a microencapsulated platinum-containing catalyst and 2) the absence of coagulation during long term heating of the silicone or polysilane resin used as the encapsulating material for the platinum-containing catalyst, and therefore at most a slight reduction in the mechanical strength of elastomeric articles molded from the curable composition.

SUMMARY OF THE INVENTION

The objective of the present invention is achieved by including in the curable organosiloxane compositions of this invention a coagulation inhibitor selected from the group consisting of carbon black and the oxides, hydroxides, carboxylates, silanolates and beta-diketonates of metallic elements other than the elements in groups IA and IIA of the Periodic Table of the elements.

DETAILED DESCRIPTION OF THE INVENTION

The present invention relates to a thermosetting organosiloxane composition comprising (A) an organopolysiloxane containing at least 2 silicon-bonded alkenyl radicals in each molecule and represented by the average formula $R_aSiO_{(4-a)/2}$ where R represents a substituted or unsubstituted monovalent hydrocarbon radical, and a represents a number with a value of from 1.8 to 2.3 inclusive.

(B) an organohydrogenpolysiloxane having at least 2 silicon-bonded hydrogen atoms in each molecule, and (C) a particulate material exhibiting an average particle size of from 0.01 to 500 micrometers and comprising a hydrosilylation-reaction catalyst that is encapsulated within a resin selected from the group consisting of silicone resins and polysilane resins, where said resin exhibits a softening point of from 40 to 200 degrees Centigrade.

The improvement that characterizes the present compositions comprises the presence of (D) an additive selected from the group consisting of carbon black and the oxides, hydroxides, carboxylates, silanolates, and beta-diketonates of metallic elements exclusive of those in IA and IIA of the Periodic Table of the elements, the concentration of said additive being sufficient to prevent coagulation of said resin during curing of said composition.

The various ingredients of the present compositions will now be discussed in detail.

A. The Organopolysiloxane

The organopolysiloxane identified as ingredient A is the principle ingredient of the present compositions. The average unit formula for this ingredient is $R_aSiO_{(4-a)/2}$, and it is essential that each molecule contain at least 2 silicon-bonded alkyenyl radicals. The group R in the formula for this ingredient represents a monovalent hydrocarbon radical as exemplified by alkyl radicals such as methyl, ethyl, propyl, butyl, hexyl, and octyl; alkenyl radicals such as vinyl, allyl, and hexenyl; aryl radicals such as phenyl; and substituted hydrocarbon radicals such as 3,3,3-trifluoropropyl. The substituent present on R is not critical so long as it does not adversely affect curing of the composition or the properties of the cured article, and the value of a is from 1.8 to 2.3.

The molecular structure of ingredient A should correspond to a straight-chain or branched siloxane framework. While the degree of polymerization of ingredient A is not specifically restricted, the viscosity of this ingredient is generally from 10 to 1,000,000 centipoise at 25 degrees Centigrade.

B. The Organohydrogenpolysiloxane

The organohydrogenpolysiloxane, referred to as ingredient B, is a crosslinker for ingredient A. It is essential that ingredient B contain at least 2 silicon-bonded hydrogen atoms in each molecule in order for the composition of the present invention to form a network structure. The silicon-bonded organic groups present in ingredient B are selected from the same group of substituted and unsubstituted hydrocarbon radicals present in ingredient A. One or more types of hydrocarbon radicals can be present in the molecules of ingredient B.

The molecular structure of ingredient B can be straight chain, network, or three dimensional. Furthermore, this ingredient can be a homopolymer or copolymer or a mixture of two or more types of polymers. The degree of polymerization of ingredient B should generally correspond to a viscosity within the range of from 0.5 to 50,000 centipoise at 25 degrees Centigrade and preferably within the range of 1 to 10,000 centipoise.

The concentration of ingredient B should be equivalent to a value of form 0.5:1 to 10:1 for the molar ratio between the silicon-bonded hydrogen atoms in ingredient B and the silicon-bonded alkenyl radicals in ingredient A. This range is typically equivalent to from 0.1 to 10 weight parts of ingredient B per 100 weight parts of ingredient (A).

C. The Encapsulated Hydrosilylation Catalyst

Ingredient C is a finely divided particulate comprising a platinum-containing or other type of hydrosilylation-reaction catalyst that is encapsulated within a silicone resin or polysilane resin. This ingredient functions as a catalyst for crosslinking of the silicon-bonded alkenyl radicals in ingredient A by the silicon-bonded hydrogen atoms in ingredient B via a hydrosilylation reaction.

The silicone or polysilane resin portion of the particulate isolates the hydrosilylation reaction catalyst contained within it from the other ingredients of the curable composition. The objective of the present invention can be achieved using 1) a particulate material in which the hydrosilylation reaction catalyst is dissolved or dispersed in a silicone resin or polysilane resin or 2) a particle wherein the hydrosilylation catalyst is present as a core within a shell or skin of silicone resin or polysilane resin, a form referred to in this specification as a "microparticle".

The hydrosilylation reaction catalyst itself can be any of the transition metal catalysts which are known to exhibit catalytic activity for hydrosilylation reactions. Specific examples of such catalyst include but are not limited to platinum-containing catalysts such as chloroplatinic acid, alcohol-modified chloroplatinic acid, platinum/olefin complexes, platinum black, and platinum supported on, for example, alumina, silica, or carbon black. Palladium-containing catalysts such as tetrakis(triphenylphosphine)palladium and rhodium-containing catalysts are also suitable for use as the catalyst portion of ingredient C.

Platinum/vinylsiloxane complexes are a preferred class of catalysts, based on their high catalytic activity and compatibility with ingredients A and B.

The resin that encapsulates the hydrosilylation reaction catalyst exhibits a softening point or glass transition temperature in the range of from 40 to 200 degrees Centigrade.

The softening point of the resin is the temperature at which the resin commences to flow under the influence of its own weight or intrinsic surface tension. The temperature at which this occurs can be simply determined by microscopic observation of the comminuted particle while raising the temperature at a constant rate. The glass transition temperature of the resin can be determined by measurement using differential scanning calorimetry.

Resins suitable for use in combination with the present hydrosilylation catalysts exhibit softening points or glass transition temperatures within the range of from 40° to 200° C. When these values are below 40° C. there is a drastic decline in the storage stability of the curable composition. In addition, the cure rate at temperatures above 200° C. is unacceptably slow.

Any of the known methods can be used to encapsulate the hydrosilylation reaction catalyst with a silicone resin or polysilane resin. These methods include but are not limited to chemical methods such as interfacial polymerization or in situ polymerization, and physical-/mechanical methods such as coacervation, in-liquid drying and gas phase drying. Of these methods in-liquid drying and gas phase drying are preferred because they yield microparticles with a narrow particle size distribution relatively easily.

While the microparticles produced by any of the aforementioned methods may be directly employed as ingredient C, it will be advantageous to wash the microparticles with a suitable washing solvent in order to remove hydrosilyation-reaction catalyst adhering at the surface of the particles. Removal of surface catalyst yields a thermosetting organopolysiloxane composition exhibiting greater storage stability.

Solvents suitable for the washing step should not dissolve the silicone resin or polysilane resin, but should dissolve the hydrosilylation-reaction catalyst. Examples of suitable washing solvents include but are not limited to alcohols such as methyl alcohol and ethyl alcohol and low-molecular-weight organopolysiloxanes such as hexamethyldisiloxane.

The microparticles comprising ingredient C should have an average particle diameter within the range of from 0.01 to 500 micrometers and preferably within the range of from 0.1 to 10 micrometers. When the average particle size falls below 0.01 micrometer, one encounter a sharp reduction in the hydrosilylation-reaction catalyst yield at the time of production. Particle diameters in excess of 500 micrometers decrease the stability of the dispersion of microencapsulated catalyst in ingredient A of the present compositions, with a resultant decline in the mechanical properties of the cured product. The particles comprising ingredient C are preferably spherical in contour.

The proportion of hydrosilylation reaction catalyst relative to silicone resin or polysilane resin varies substantially with the method for producing the microparticles comprising ingredient C, and thus cannot be strictly specified. Ingredient C advantageously contains at least 0.01% weight percent of the hydrosilylation reaction catalyst. At catalyst concentrations below 0.01%, the proportion of silicone resin or polysilane resin in the present invention's composition will become sufficiently high to adversely affect the properties of cured materials prepared from the present compositions.

The concentration of ingredient C should generally be sufficient to provide a concentration of hydrosilylation catalyst equivalent to from 0.01 to 1000 parts by weight, preferably from 0.01 to 100 parts by weight of the platinum or other metal present in the catalyst per million weight parts (ppm) of ingredient A.

While ingredient C itself is generally present within the range of 0.005 to 100 weight parts, larger amounts can be used so long as the concentration of platinum or other metal present in the catalyst is within the range specified in the preceding paragraph.

D. The Metal Compound

Ingredient D inhibits coagulation of the silicone resin or polysilane resin portion of the microparticles (ingredient C) when the cured product, such as a molding, is subjected to long-term heating conditions after curing. Ingredient D is selected from carbon black, and the oxides, hydroxides, carboxylates, silanolates, and beta-diketonates of metallic element other than those of group IA and IIA of the Periodic Table of the elements. Representative metals include but are not limited to cobalt, manganese, zinc, copper, iron, zirconium, chromium, tin, nickel, aluminum, vanadium, and rare-earth metals such as cerium and lanthanum.

It is essential that these metals be added to the composition in the form of their oxides, hydroxides, carboxylates (e.g., of octylic acid or naphthenic acid), beta-diketonates, or silanolates. Preferred embodiments of ingredient D include cerium acetylacetonate, cerium naphthenate, cerium silanolate, cobalt acetylacetonate, cobalt octylate, iron acetylacetonate, manganese acetylacetonate, zinc octylate and zirconium octylate.

When ingredient D is carbon black, an oxide or hydroxide, the concentration of this ingredient is from 0.01 to 10 weight parts of this ingredient per 100 weight parts of ingredient A. The beneficial coagulation inhibiting effect of these additives is not observed at concentrations below 0.01 weight parts, while a concentration above 10 weight parts typically results in a decrease in the heat resistance of ingredient A and a decrease in the mechanical strength of the cured molding.

When ingredient D is a carboxylate, beta-diketonate or silanolate the concentration of ingredient D in the present compositions is typically from 0.0001 to 0.1 weight parts and preferably from 0.0005 to 0.1 weight parts, based on the metallic portion of this ingredient, per 100 weight parts of ingredient A. Coagulation of the resin portion of the microparticles (ingredient C) in the cured product is not significantly inhibited at concentrations of ingredient D equivalent to a metal content below about 0.0001 weight parts when ingredient D is a carboxylate, beta-diketonate or silanolate.

Exceeding a concentration equivalent to 0.1 weight part of the constituent metal portion of ingredient D when this ingredient is a carboxylate, beta-diketonate or silanolate results in a decrease in the heat resistance of ingredient A and a decline in the mechanical strength of the molding or other cured product.

While the foregoing description is limited to organosiloxane compositions consisting essentially of ingredients A through D, additional ingredients can be present in the composition as desired or an necessary so long as the objective of the present invention is not compromised. These additional ingredients include but are not limited to microparticulate silica such as fumed silica or wet-method silicas, surface-hydrophobicized microparticulate silica, crepe-hardening inhibitors, storage stabilizers and/or hydrosilylation catalyst inhibitors such as phenylbutynol, non-organopolysiloxane polymers, heat stabilizers, flame retardants, quartz powder, diatomaceous earth, calcium carbonate, glass fiber, and so forth.

The present curable composition can be prepared simply by mixing the aforementioned ingredients (A) through (D), together with and any additional ingredients, to homogeneity. The mixing sequence is not specifically restricted, but an advantageous method consists of homogeneously dispersing ingredient (C) in a small quantity of ingredient (A) and then adding this to a mixture of (A), (B), (D), and any additional ingredients.

Any means may be used in blending the ingredients of the present composition so long as the microparticles (ingredient C) containing the hydrosilylation catalyst are not fractured or destroyed. The temperature(s) used to prepare the present compositions cannot be unconditionally specified, as the temperature will vary with the ingredient (C) actually used. The one requirement is that the temperature must be below the softening point of the thermoplastic resin portion of ingredient C.

ADVANTAGES OF THE PRESENT COMPOSITIONS

Because the present compositions exhibit excellent room-temperature storage stability, they can be stored for long periods of tie as single-component curable organosiloxane compositions. Moreover, even when the elastomeric molding is subjected to long-term heating after curing, coagulation of the resin portion of the microparticles does not occur and there is little reduction in mechanical strength. Accordingly, the compositions of the present invention are very suitable for preparing a silicone rubber, silicone gel or silicone resin these properties are critical.

EXAMPLES

The present invention is explained in detail by means of the following non-limiting examples in which viscosity are determined at 25 degrees Centigrade and cp=centipoise.

REFERENCE EXAMPLE 1

Preparation of a Platinum/Vinylsiloxane Complex

160 Grams of 1,3-divinyltetramethyldisiloxane and 32.0 g chloroplatinic acid (H2PtCl6.6H2O) were blended together and then heated at 120 degrees Centigrade for 1 hour with stirring under a stream of nitrogen. The platinum black by-product was then removed by filtration, following which the unreacted acid was removed by washing with water to yield a platinum/vinylsiloxane complex in which 1,3-divinyltetramethyldisiloxane was coordinated with chloroplatinic acid. The platinum metal concentration in this reaction product was 4.25%.

REFERENCE EXAMPLE 2

Preparation of a Platinum Catalyst-Containing Silicone Resin Microparticle

The following ingredients were dissolved in 330 g methylene chloride: 2.0 g of the platinum/vinylsiloxane complex catalyst prepared in Reference Example 1 and 16.0 g silicone resin having a softening point of 110 degrees Centigrade and consisting essentially of 12 mole % diphenylsiloxane units, 21 mole % dimethylsiloxane units, and 67 mole % monophenylsiloxane units.

The solubilized resin was added with stirring to a large amount of water which contained 15 g polyvinyl alcohol (Gosenol GL-05 from Nippon Gosei Kagaku Kogyo Kabushiki Kaisha). The methylene chloride was then removed by evaporation over 48 hours at 25 to 40 degrees Centigrade. The solid material that formed during the evaporation was separated from the resulting suspension by centrifugal separation. The solids were washed with water and then washed with a large quantity of methyl alcohol to yield spherical platinum-containing silicone resin microparticles containing 0.21% platinum and having an average particle diameter of 7 micrometers.

REFERENCE EXAMPLE 3

Preparation of a Platinum-Containing Polysiloxane Resin Microparticles

The procedure of Reference Example 2 was repeated, substituting 8.0 g a polysilane resin exhibiting a softening point of 135 degrees Centigrade for the silicone resin of Reference Example 2. The final product was a spherical platinum-containing polysilane resin microparticle that contained 0.27% platinum and had an average particle diameter of 10 micrometers.

REFERENCE EXAMPLE 4

Alternate Preparation of Silicone Resin Microencapsulated Catalyst

60 Grams of an aqueous chloroplatinic acid solution containing 33% platinum and 160 g 1,3-divinyltetramethyldisiloxane were dissolved in 350 g isopropyl alcohol. 100 g sodium bicarbonate was then added to the resultant solution and this suspension was heated for 60 minutes at 70 to 80 degrees Centigrade with stirring. The isopropyl alcohol and water were then evaporated off at 45 Centigrade under a pressure of 50 mm Hg. Removal of the solid residue by filtration yielded a catalyst solution containing 8.5 weight percent platinum.

A solution consisting of 1,000 g phenyltrichlorosilane, 160 g dimethyldichlorosilane, and 330 g diphenyldichlorosilane was hydrolyzed and then diluted with 500 g toluene. The organic phase was isolated after removal of the hydrogen chloride. 0.6 Grams of potassium hydroxide were added to this phase, followed by removal of the water by distillation under ambient pressure. The resultant liquid was neutralized and then washed repeatedly with water. Removal of the solvent yielded a thermoplastic silicone resin (R4) with a glass-transition temperature of 65 degrees Centigrade and a softening point of 85 degrees Centigrade.

The following ingredients were introduced into a stirrer-equipped glass vessel and mixed to homogeneity: 900 g of the thermoplastic silicone resin R4, 500 g toluene, and 4600 g dichloromethane. To the resultant mixture was added 44.4 g of the platinum catalyst solution obtained as described in a preceding section of this example, and a homogeneous solution containing the platinum catalyst and thermoplastic silicone resin was prepared by mixing.

This solution was continuously sprayed through a dual liquid nozzle into a spray dryer tank (manufactured by Ashizawa Nitro Atomizer Kabushiki Kaisha) in which a stream of heated nitrogen was circulating. The temperature of the nitrogen at the spray drier inlet was 95° C. and 45° C. at the spray dryer outlet.

450 Grams of platinum-catalyst containing silicone resin microparticles was recovered using a bag filter during one hour of operation. These microparticles had an average particle diameter of 1.1 micrometers, were spherical, and has a platinum metal content of 0.40 weight %.

Examples 1 through 3 employ carboxylates, beta-diketonates and silanolates as the coagulation inhibitor. Examples 4 to 6 employ carbon black, metal oxides and hydroxides as the coagulation inhibitor.

EXAMPLE 1

20 Grams fumed silica that had been hydrophobicized with hexamethyldisilazane were thoroughly mixed into 100 g of an alpha,omega-divinyldimethylpolysiloxane with a viscosity of 1,500 cp (ingredient A). 0.01 Gram of phenylbutynol as the platinum catalyst inhibitor and 2.8 g of an organohydrogenpolysiloxane (ingredient B) with the average molecular formula

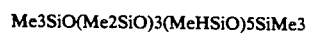

Me3SiO(Me2SiO)3(MeHSiO)5SiMe3 were then added with mixing to homogeneity to form Composition 1. Heat curable organosiloxane compositions of this invention were prepared by adding the following to 100 weight parts of Composition 1: 0.25 weight parts of the silicone resin microencapsulated platinum catalyst prepared as described in Reference Example 2 and an amount of a metal compound (ingredient D) specified in Table 1. The concentration of ingredient D in each of the compositions is expressed as parts by weight of the metal portion of each metal compound per 10,000 weight parts of composition 1.

Each of the compositions were cured by pressing it for 5 minutes at 130 degrees Centigrade to yield a 2 mm-thick sheet. Each sheet was then heated for 3 days at 250 degrees Centigrade in a hot air-circulation oven, then visually inspected to determine the presence of coagulated silicone resin in the rubber. The results of the visual inspection are reported in Table 1.

For purposes of comparison, a curable organosiloxane composition was prepared following the procedure describe din the preceding section of this example, but omitting the metal compound (ingredient D). The cured sheet prepared using this composition was also visually inspected for the presence of coagulated resin, and the results of this inspection are also reported in Table 1.

TABLE 1

Quantity of Metal Compound Addition and Coagulated Resin Production

| Metal Compounds (a) | Examples | | | | | Comparison Example |
|---|---|---|---|---|---|---|
| | 1-1 | 1-2 | 1-3 | 1-4 | 1-5 | 1 |
| cerium naphthenate | 0.8 | — | — | — | — | — |
| manganese naphthenate | — | 1.2 | — | — | — | — |
| iron naphthenate | — | — | 1.2 | — | — | — |
| cobalt octylate | — | — | — | 1.6 | — | — |
| cerium silanolate | — | — | — | — | 0.4 | — |
| production of coagulate | no | no | no | no | no | yes |

(a) Concentration of metal compound expressed as number of weight parts of equivalent metal per 10,000 weight parts composition-1.

EXAMPLE 2

Curable organosiloxane compositions were prepared as described in Example 1 with the following two modifications: the compounds reported in Table 2 were used in place of the metal compounds reported in Table 1, and 0.50 g of the platinum-containing polysilane resin-based microparticles prepared as described in Reference Example 3 were used in place of the platinum-containing silicone resin microparticles. The cured compositions were evaluated as in described in Example 1, and these results are reported in Table 2.

were performed on 2 mm-thick cured sheets prepared by pressing the composition for 5 minutes at 170° C.

The ability of beta-diketonates of this invention to inhibit resin coagulation was investigated and the results are reported in Table 4.

TABLE 3

| Metal Compound (a) | Example 3-1 | 3-2 | 3-3 | 3-4 | 3-5 | 3-6 | Comparative Example |
|---|---|---|---|---|---|---|---|
| cerium naphthenate | 0.8 | — | — | — | — | — | — |
| manganese naphthenate | — | 1.2 | — | — | — | — | — |
| cobalt octylate | — | — | 1.6 | — | — | — | — |
| zirconium octylate | — | — | — | 2.4 | — | — | — |
| zinc octylate | — | — | — | — | 3.6 | — | — |
| cerium silanolate | — | — | — | — | — | 0.4 | — |
| Coagulation of Resin | No | No | No | No | No | No | Yes |
| Initial Cured Properties | | | | | | | |
| Hardness* | 56 | 56 | 59 | 66 | 63 | 56 | 57 |
| Tensile Strength (kg/cm$^2$) | 89 | 92 | 93 | 103 | 93 | 93 | 96 |
| Elongation (%) | 692 | 751 | 684 | 612 | 633 | 720 | 731 |
| Tear Strength (kg/cm) | 32 | 33 | 33 | 31 | 35 | 31 | 32 |
| % Change After Heating 72 Hours @ 250° C. | | | | | | | |
| Hardness | +18 | +17 | +13 | +13 | +17 | +17 | +14 |
| Tensile Strength (kg/cm$^2$) | −27 | −41 | −30 | −46 | −56 | −24 | −95 |
| Elongation (%) | −51 | −57 | −45 | −64 | −70 | −47 | −85 |
| Tear Strength (kg/cm) | | | | | | | |

(a) The values given in the table report the number of weight parts added as metal atoms referred to per 10,000 weight parts of curable composition.
*Hardness measured using Japan Industrial Standard test procedure K 6301.

Quantity of Metal Compound Addition and Coagulated Resin Production

| Metal Compound (a) | Examples 2-1 | 2-2 | Comparison Example 2 |
|---|---|---|---|
| cerium naphthenate | 0.8 | — | — |
| cerium silanolate | — | 0.4 | — |
| production of coagulated resin | no | no | yes |

(a) The concentration of metal compound is expressed as parts by weight of the corresponding metal per 10,000 weight parts of composition 1.

EXAMPLE 3

The following ingredients were introduced into a heated kneader mixer and to homogeneity: as ingredient A, 100 weight parts of an organopolysiloxane gum exhibiting a degree of polymerization of 5,000 and consisting essentially of 99.8 mole % dimethylsiloxane units and 0.2 mole % methylvinylsiloxane units, 8.0 parts of a silanol group-terminated dimethylpolysiloxane exhibiting a viscosity of 60 cps, and 40 weight parts of a fumed silica with a specific surface area of 200 m2/g. Curable organosiloxane compositions were prepared by adding the following ingredients were added to 100 weight parts of the resultant base and blending to homogeneity: one of the metal compounds (ingredient D) listed in Table 3 or Table 4 dispersed in 0.40 parts of an organohydrogenpolysiloxane (ingredient B) exhibiting the average molecular formula Me3SiO(Me2SiO)3(MeHSiO)5SiMe3 followed by 0.001 parts 1-ethynyl-1-cyclohexanol and 0.02 parts of the platinum-containing silicone resin microparticles prepared as described in Reference Example 2.

Each of the compositions was cured and evaluated as described in Example 1. In addition, for the compositions listed in Table 3, certain mechanical properties of the cure rubber were measured, both immediately after curing and after post-cure heating. The measurements

TABLE 4

Quantity of Metal Compound Addition (a) and Coagulate Production

| Metal Compound | Examples 3-7 | 3-8 | 3-9 | Comparison Example |
|---|---|---|---|---|
| cobalt acetylacetonate | 3.4 | — | — | — |
| iron acetylacetonate | — | 3.2 | — | — |
| manganese acetylacetonate | — | — | 3.8 | — |
| production of coagulated resin | no | no | no | yes |

(a) The values given in the table report the number of weight parts added as metal atoms referred to per 10,000 weight parts of curable composition.

EXAMPLE 4

The following ingredients were added to 100 parts of the rubber base described in the preceding example 3 and then blended to yield a homogeneous curable organosiloxane composition:

1) a mixture of 0.20 parts cerium silanolate, as a solution in a liquid dimethylpolysiloxane and containing 20 weight % cerium, in 0.40 parts siloxane with the following average molecular formula Me3SiO(Me2SiO)3(MeHSiO)5SiMe3, followed by 2) 0.04 part of the platinum-containing silicone resin microparticle prepared as described in Reference Example 4, and 3) 0.001 parts 1-ethynyl-1-cyclohexanol.

The comparison example consisted of a curable organosiloxane composition prepared as described in the preceding section of this example, but without addition of the cerium silanolate.

Using the procedure described in the preceding example 3, both compositions were cured and the mechanical properties of the resulting rubbers were measured immediately after curing and after heating, according to the methods described in JIS K 6301. These results are reported in Table 5.

TABLE 5

|  | Example 4 | Comparison Example |
|---|---|---|
| Initial properties |  |  |
| hardness | 58 | 59 |
| tensile strength (kg/cm2) | 102 | 107 |
| elongation (%) | 680 | 685 |
| tear strength (kg/cm) | 32 | 32 |
| After heating (72 hr/250 degrees Centigrade) |  |  |
| change in hardness | +18 | +17 |
| change in tensile strength (%) | −28 | −90 |
| change in elongation (%) | −49 | −82 |

EXAMPLE 5

The following ingredients were introduced into a kneader mixer and blended with heating unit homogeneous: 100 weight parts of a organopolysiloxane gum exhibiting a degree of polymerization of 5,000 an consisting essentially of 99.8 mole % dimethylsiloxane units and 0.15 mole % methylvinylsiloxane units, 8.0 parts of a silanol group-terminated dimethylsiloxane exhibiting a viscosity of 60 cp, and 40 weight parts of fumed silica with a specific surface area of 200 m²/g.

Curable organosiloxane compositions of this invention were prepared by adding the following ingredients to 100 weight parts of the resultant silicone rubber base:

1) carbon black or one of the metal compounds listed in Table 6, all as a dispersion in 0.30 weight parts siloxane with the average molecular formula $$Me_3SiO(Me_2SiO)_3(MeHSiO)_5SiMe_3$$

2) 0.001 weight parts of 1-ethynyl-1-cyclohexanol and 3) 0.04 weight parts of the platinum-containing silicone resin microparticles prepared as described in Reference Example 2.

Each of the compositions were cured in the form of a 2 mm-thick sheet by pressing the composition for 5 minutes at 130 degrees Centigrade followed heating for 2 hours at 200 degrees Centigrade. The sheet was then heat treated for 3 days in a air-circulation oven maintained at 250 degrees Centigrade.

The sheets were then visually inspected under an optical microscope to determine the presence of coagulated material from the silicone resin microparticles. In addition, the mechanical properties of the cured sheets were measured. Hardness was determined using the procedure specified in Japan Industrial Standard (JIS) K 6301.

For comparative purposes, a curable organosiloxane composition was prepared using the procedure described in the first part of this example, but without addition of any coagulation inhibitor (ingredient D). The physical and optical properties of this composition are also reported in Table 6.

TABLE 6

| Coagulation Inhibitor | Examples | | | | | | Comparison Example |
|---|---|---|---|---|---|---|---|
|  | 5-1 | 5-2 | 5-3 | 5-4 | 5-5 | 5-6 |  |
| Cerium oxide | 0.5 | — | — | — | — | — | — |
| Cerium hydroxide | — | 0.5 | — | — | — | — | — |
| Red iron oxide | — | — | 0.5 | — | — | — | — |
| Titanium oxide | — | — | — | 1.0 | — | — | — |
| Manganese oxide | — | — | — | — | 1.0 | — | — |
| Acetylene black | — | — | — | — | — | 1.0 | — |
| Coagulatin of resin | no | no | no | no | no | no | yes |
| Initial properties |  |  |  |  |  |  |  |
| Hardness | 48 | 48 | 49 | 45 | 50 | 47 | 49 |
| Tensile strength (kg/cm²) | 96 | 102 | 80 | 96 | 87 | 98 | 95 |
| Elongation (%) | 712 | 730 | 582 | 704 | 640 | 704 | 702 |
| Tear strength (kg/cm) | 30 | 31 | 32 | 36 | 31 | 33 | 33 |
| After heating 72 hr. @ 50° C. |  |  |  |  |  |  |  |
| % Change in hardness | +8 | +8 | +8 | +11 | +12 | +10 | +14 |
| % Change in tensile strength | −25 | −24 | +3 | −17 | −10 | −10 | −93 |
| % Change in elongation | −35 | −32 | −21 | −37 | −34 | −28 | −87 |

EXAMPLE 6

Thermosetting organopolysiloxane compositions were prepared as in Example 5 with the following modifications: the compounds listed in Table 7 were used in place of the metal compounds listed in Table 6, and curing was conducted at 170° C. for 10 minutes using 0.50 g of the platinum-containing polysilane resin microparticles prepared as described in Reference Example 3 in place of the platinum-containing microparticles of Reference Example 2. These compositions were cured and evaluated as described in Example 5, and the results of the evaluations are reported in Table 7.

TABLE 7

| Compositions and Properties | Examples | | | | Comparison Example |
|---|---|---|---|---|---|
|  | 5-1 | 5-2 | 5-3 | 5-4 |  |
| cerium oxide | 0.5 | — | — | — | — |
| red iron oxide | — | 0.5 | — | — | — |
| titanium oxide | — | — | 1.0 | — | — |
| acetylene black | — | — | — | 1.0 | — |
| coagulation of resin | no | no | no | no | yes |
| Initial Properties |  |  |  |  |  |
| hardness | 49 | 49 | 46 | 47 | 49 |
| tensile strength (kg/cm²) | 85 | 90 | 92 | 93 | 90 |
| elongation (%) | 650 | 670 | 690 | 695 | 667 |
| tear strength (kg/cm) | 29 | 31 | 33 | 32 | 30 |
| After Heating (72 hours at 250 degrees Centigrade) |  |  |  |  |  |
| change in hardness | +9 | +8 | +11 | +10 | +15 |
| change in tensile strength (%) | −22 | −23 | −25 | −20 | −95 |
| change in elongation (%) | −40 | −32 | −37 | −25 | −89 |

EXAMPLE 7

20 Grams fumed silica that had been hydrophobicized with hexamethyldisilazane were thoroughly blended into a mixture of 100 g of an alpha,omega-divinyldimethylpolysiloxane with a viscosity of 1,500 cp and 0.01 g phenylbutynol. 2.8 Grams of an organohydrogenpolysiloxane (ingredient B) with the following average molecular formula $$Me_3SiO(Me_2SiO)_3(MeHSiO)_5SiMe_3$$

were then added with mixing to achieve homogeneity. Curable organosiloxane compositions were prepared by blending the following ingredients into 100 weight parts of the resultant mixture: the specified quantity of metal compound or carbon black as reported in Table 8 and, in each sample, 0.25 weight parts of the platinum-containing silicone resin microparticles prepared as described in Reference Example 2. Each of these compositions was cured by pressing for 5 minutes at 130 degrees Centigrade to yield a 2 mm-thick sheet. Each sheet was subsequently heated for 3 days at 250 degrees Centigrade in a air-circulation oven. These sheets were evaluated as described in Example 5, and the results are reported in Table 8.

TABLE 8

| Compositions and Properties | Examples | | | | Comparison Example |
|---|---|---|---|---|---|
| | 7-1 | 7-2 | 7-3 | 7-4 | |
| cerium oxide | 0.5 | — | — | — | — |
| red iron oxide | — | 0.5 | — | — | — |
| titanium oxide | — | — | 1.0 | — | — |
| acetylene black | — | — | — | 1.0 | — |
| Coagulation of Resin | no | no | no | no | yes |
| initial properties | | | | | |
| hardness | 32 | 34 | 30 | 31 | 33 |
| tensile strength (kg/cm$^2$) | 92 | 90 | 95 | 93 | 95 |
| elongation (%) | 752 | 730 | 780 | 772 | 745 |
| tear strength (kg/cm) | 14 | 14 | 14 | 14 | 14 |
| after heating (72 hours at 250 degrees Centigrade) | | | | | |
| change in hardness | +20 | +18 | +25 | +21 | +32 |
| change in tensile strength (%) | −32 | −28 | −39 | −33 | −80 |
| change in elongation (%) | −35 | −30 | −40 | −37 | −87 |

EXAMPLE 8

Curable organopolysiloxane compositions were prepared as described in Example 5 with the following modifications: 1) the additives (ingredient D) listed in Table 9 were used in place of the additives of Table 6 and 0.02 weight part of the platinum-catalyst-containing silicone resin microparticles prepared as described in Reference Example 4 was used in place of the microparticles described in Reference Example 2. The compositions were cured as described in Example 5, and the mechanical properties of the resultant sheets were measured. The results of these evaluations are recorded in Table 9,

TABLE 9

| Compositions and Properties | Examples | |
|---|---|---|
| | 8-1 | 8-2 |
| cerium oxide | 0.5 | — |
| acetylene black | — | 1.0 |
| production of coagulate | no | no |
| Initial properties | | |
| hardness | 49 | 49 |
| tensile strength (kg/cm2) | 103 | 95 |
| elongation (%) | 742 | 690 |
| tear strength (kg/cm) | 33 | 32 |

TABLE 9-continued

| Compositions and Properties | Examples | |
|---|---|---|
| | 8-1 | 8-2 |
| After heating (72 hr/250 degrees Centigrade) | | |
| change in hardness | +8 | +9 |
| change in tensile strength (%) | −21 | −13 |
| change in elongation (%) | −32 | −25 |

That which is claimed is:

1. In a curable organosiloxane composition consisting essentially of:
    (A) an organopolysiloxane containing at least 2 silicon-bonded alkenyl radicals in each molecule and represented by the average formula $R_aSiO_{(4-a)/2}$, where R represents a substituted or unsubstituted monovalent hydrocarbon radical and a represents an umber with a value of from 1.8 to 2.3, inclusive,
    (B) an organohydrogenpolysiloxane containing at least 2 silicon-bonded hydrogen atoms in each molecule, and
    (C) a particulate material exhibiting an average particle size of from 0.01 to 500 micrometers and consisting essentially of a hydrosilylation catalyst and a resin selected from the group consisting of silicone resins and polysilane resins, where said resins exhibit a softening point or glass transition temperature of from 40 to 200 degrees Centigrade and prevent contact between said catalyst and the other ingredients of said composition, the improvement comprising the presence in said composition of
    (D) an additive selected from the group consisting of the carboxylates, silanolates and beta-diketonates of metallic elements exclusive of those in groups IA and IIA of the Periodic Table, where the concentration of said additive is equivalent to from 0.0005 to 0.1 weight parts of the metallic element per 100 parts of said organopolysiloxane.

2. An organosiloxane composition according to claim 1 where said metallic element is selected from the group consisting of cerium, cobalt, manganese, zinc, iron, and zirconium and the concentration of said additive is from 0.0005 to 0.1 weight parts of said element per 100 parts of said organopolysiloxane.

3. An organosiloxane composition according to claim 2 where said coagulation inhibitor is selected from the group consisting of cerium acetylacetonate, cerium naphthenate, cerium silanoate, cobalt acetylacetonate, cobalt octylate, iron acetylacetonate, manganese acetylacetonate, zinc octylate and zirconium octylate.

4. An organosiloxane composition according to claim 1 where the hydrosilylation catalyst is platinum or a platinum compound, the average particle size of said particulate is from 0.01 to 500 micrometers, the viscosity of said organopolysiloxane is from 10 to 1,000,000 centipoise at 25° C., the viscosity of said organohydrogenpolysiloxane is from 0.5 to 50,000 centipoise at 25° C. and the molar ratio of silicon-bonded hydrogen atoms in said organohydrogenpolysiloxane to alkenyl radicals in said organopolysiloxane is from 0.5/1 to 10/1.

5. An organosiloxane composition according to claim 4 where said average particle size is from 0.1 to 10 micrometers, the viscosity of said organohydrogenpolysiloxane is from 1 to 10,000 centipoise at 25° C. and the particles of said particulate material are spherical in contour.

* * * * *